(12) United States Patent
Mak

(10) Patent No.: US 8,840,707 B2
(45) Date of Patent: Sep. 23, 2014

(54) CONFIGURATIONS AND METHODS FOR GAS CONDENSATE SEPARATION FROM HIGH-PRESSURE HYDROCARBON MIXTURES

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1738 days.

(21) Appl. No.: 11/571,591

(22) PCT Filed: Jun. 22, 2005

(86) PCT No.: PCT/US2005/022298
§ 371 (c)(1),
(2), (4) Date: Jan. 8, 2008

(87) PCT Pub. No.: WO2006/014242
PCT Pub. Date: Feb. 9, 2006

(65) Prior Publication Data
US 2008/0168797 A1 Jul. 17, 2008

Related U.S. Application Data

(60) Provisional application No. 60/586,033, filed on Jul. 6, 2004.

(51) Int. Cl.
*B01D 19/00* (2006.01)
*B01D 53/14* (2006.01)
*B01D 3/00* (2006.01)
*C10L 3/12* (2006.01)

(52) U.S. Cl.
CPC . *C10L 3/12* (2013.01); *B01D 53/14* (2013.01); *B01D 19/00* (2013.01); *B01D 3/00* (2013.01)

USPC .................. 95/165; 95/159; 95/160; 95/161; 95/167; 95/191; 95/204; 95/263; 62/620; 62/630; 62/631

(58) Field of Classification Search
CPC ....... F25J 3/0209; F25J 3/0233; F25J 3/0238; F25J 3/0242; F25J 2200/40; F25J 2200/74; F25J 2205/04; F25J 2215/66; F25J 2220/64; F25J 2230/60; F25J 2290/12; C10L 3/10; C10L 3/12
USPC .......................... 62/632, 618–620, 630, 631; 95/159–161, 164, 165, 167, 191, 204, 95/206, 263
See application file for complete search history.

(56) References Cited

U.S. PATENT DOCUMENTS

| 2,666,019 | A | * | 1/1954 | Steffens et al. | ............... 208/351 |
| 2,930,752 | A | * | 3/1960 | Swerdloff | ..................... 208/341 |
| 4,462,813 | A | | 7/1984 | May et al. | |
| 4,507,133 | A | | 3/1985 | Khan | |
| 4,623,371 | A | * | 11/1986 | Mehra | ............................. 62/632 |

(Continued)

*Primary Examiner* — Frantz Jules
*Assistant Examiner* — Keith Raymond
(74) *Attorney, Agent, or Firm* — Fish & Tsang, LLP

(57) ABSTRACT

A gas condensate production plant comprises a plurality of separation units in which $C_2$ and/or $C_3$ lighter components are stripped from the separator feeds using compressed heated stripping vapor produced from the feed in respective downstream separation units. Contemplated plants substantially reduce heating and cooling duties by using the waste heat from the compressor discharges in the separation process. Furthermore, the multi-stage fractionation according to the inventive subject matter provides improved gas condensate recovery at reduced energy costs.

16 Claims, 3 Drawing Sheets

(56) References Cited

U.S. PATENT DOCUMENTS

| | | | |
|---|---|---|---|
| 4,695,672 A | 9/1987 | Bunting | |
| 4,702,819 A | 10/1987 | Sharma | |
| RE33,408 E | 10/1990 | Khan | |
| 5,680,775 A * | 10/1997 | Manley | 62/630 |
| 5,685,170 A | 11/1997 | Sorensen | |
| 5,737,940 A | 4/1998 | Yao et al. | |
| 5,806,339 A * | 9/1998 | Manley | 62/631 |
| 6,112,549 A | 9/2000 | Yao | |
| 6,139,605 A * | 10/2000 | Carnell et al. | 95/164 |
| 6,658,893 B1 | 12/2003 | Mealey | |
| 6,837,070 B2 * | 1/2005 | Mak | 62/625 |

\* cited by examiner

Prior Art Figure 1

CONFIGURATIONS AND METHODS FOR GAS CONDENSATE SEPARATION FROM HIGH-PRESSURE HYDROCARBON MIXTURES

This application claims priority to our U.S. provisional patent application with the Ser. No. 60/586,033, which was filed Jul. 6, 2004 and which is incorporated by reference herein.

FIELD OF THE INVENTION

The field of the invention is gas processing, especially as it relates to separation of gas condensate (predominantly $C_4$ and heavier hydrocarbons) from a high-pressure vapor liquid mixture.

BACKGROUND OF THE INVENTION

Processing of hydrocarbon mixtures from high-pressure gas liquid pipelines (e.g., from a dense phase pipeline or well-head fluid) is often problematic, especially where such mixtures contain relatively large quantities of $C_3$, $C_4$, and heavier components (e.g., 20 to 40 mol %). Among other things, all or almost all of the currently known configurations and methods require substantial amounts of energy for various heating and cooling processes, and at least some of the known processes have relatively low recovery levels for $C_3$, $C_4$, and heavier components.

For example, a typical known configuration for processing high-pressure hydrocarbon mixtures is described in U.S. Pat. No. 4,702,819 to Sharma et al. Here, relatively high $C_3$ and $C_4$+recoveries are achieved using external refrigeration (typical propane refrigeration) and heating. While such configurations allow for at least somewhat desirable levels of $C_3$ and $C_4$+recovery, effective operation is typically limited to temperatures below ambient temperature. Moreover, numerous heat exchangers and columns are needed for heat integration. In another known configuration, as exemplified in U.S. Pat. No. 4,462,813 to May et al., a multi-stage compressor is connected to wellhead, refrigeration unit, and separators. Similar to Sharma's configuration, May's configuration tends to be relatively inefficient and energy intensive where the high-pressure hydrocarbon mixtures comprises significant quantities of $C_3$ and $C_4$+components.

In still further known examples, as described in Re33408 or U.S. Pat. No. 4,507,133 to Khan et al., the vapor stream from a deethanizer is cooled to liquefaction and contacted with a vapor phase from the hydrocarbon feed stream to separate methane, ethane, and propane vapors from the feed. Similarly, as described in U.S. Pat. No. 6,658,893 to Mealey, the feed gas is cooled to liquefy the heavier components and at least some of the $C_2$ and lighter components. Subsequent condensation and absorption steps then allow high recovery of $C_3$ and $C_4$+components. Such processes typically allow high yields of $C_3$ and $C_4$+, however, require substantial amounts of energy for cooling and pumping the liquids.

Alternatively, an absorber can be employed upstream from an expander, wherein the cooled vapor streams from the absorber are combined with the cooled and expanded vapor stream of a downstream distillation column as taught by Sorensen in U.S. Pat. No. 5,685,170. While such configurations advantageously make use of the pressure in the feed gas, a gas dehydration unit must be installed for the cryogenic expander operation, and residue gas in such plants needs to be recompressed which negates any cost or energy savings.

Thus, while numerous configurations and methods for gas condensate hydrocarbon separation are known in the art, all or almost all of them, suffer from one or more disadvantages. Therefore, there is still a need for improved configurations and methods for gas condensate separation, and especially for gas condensate separation from high-pressure hydrocarbon mixtures.

SUMMARY OF THE INVENTION

The present invention is directed to configurations and methods for gas condensate recovery from hydrocarbon-containing streams, especially where such streams have relatively high pressure. The term "gas condensate" as used herein refers to a hydrocarbon fraction that comprises C4 and heavier components, and that may further include a minor fraction of C3 (i.e., typically less than 3%, more typically less than 2%, and most typically less than 1%). Most preferably, the gas condensate is separated in a series of separation units in which $C_2$, $C_3$, and lighter components are stripped using hot compressed stripping vapor, typically generated as hot compressor discharge from a vapor product of a downstream separation unit.

In one aspect of the inventive subject matter, a gas condensate production plant has a separation unit that is configured to receive a feed comprising $C_2$ and lighter components and $C_3$, $C_4$, and heavier components, wherein the separation unit is configured to operate under conditions that allow stripping of the $C_2$ and/or $C_3$ and lighter components from the feed using a hot and compressed recycle stream comprising $C_2$ and/or $C_3$ and lighter components. Preferably, the recycle stream is generated in a second separation unit downstream of the separation unit, and at least one of the separation unit and the second separation unit is a vapor-liquid separator. Furthermore, it is generally preferred that the recycle stream comprising the $C_2$ and/or $C_3$ and lighter components is in vapor form and compressed to a pressure at which the separation unit operates, wherein the separation unit is configured to receive the recycle stream comprising the $C_2$ and/or $C_3$ and lighter components as a stream separate from the feed.

Where desirable, contemplated plants will further include a second separation unit fluidly coupled to the separation unit such that the second separation unit receives a liquid product from the separation unit and wherein the second separation unit is further configured to produce the recycle stream. In such plants, it is preferred that the second separation unit is configured to form the recycle stream by stripping the liquid product with a compressed vapor enriched in $C_2$ and/or $C_3$ and lighter components.

Thus, in another aspect of the inventive subject matter, a gas condensate production plant will have a plurality of separation units coupled to each other such that compressed vapor product of a downstream separation unit strips $C_2$ and/or $C_3$ and lighter components from a feed in an upstream separation unit to thereby form a liquid product comprising predominantly (>96%) $C_4$ and heavier components. The liquid product formed in the upstream separation unit is preferably fed to the downstream separation unit as a feed, and the upstream separation unit comprises a high-pressure vapor-liquid separator.

Contemplated plants will typically include a mixing unit configured to allow mixing of the compressed vapor product and the feed prior to entry into the upstream separation unit. Suitable downstream separation units comprise a vapor-liquid separator (typically configured to receive a mixture of the liquid product and a compressed vapor enriched in $C_2$ and lighter components) or a fractionator (typically configured to the liquid product as a feed and a compressed vapor enriched in $C_2$ and lighter components as a stripping vapor).

Consequently, a method of producing gas condensate will include a step in which $C_2$ and/or $C_3$ and lighter components are separated from a second feed in a downstream separation unit to thereby form a liquid product comprising predominantly $C_4$ and heavier components. In another step, the separated $C_2$ and/or $C_3$ and lighter components are compressed, and in yet another step, the most typically hot and compressed separated $C_2$ and/or $C_3$ and lighter components are employed to strip $C_2$ and/or $C_3$ and lighter components from a first feed in an upstream separation unit to thereby form the second feed.

Various objects, features, aspects and advantages of the present invention will become more apparent from the following detailed description of preferred embodiments of the invention.

BRIEF DESCRIPTION OF THE DRAWINGS

Prior Art

DETAILED DESCRIPTION

Figure 1:
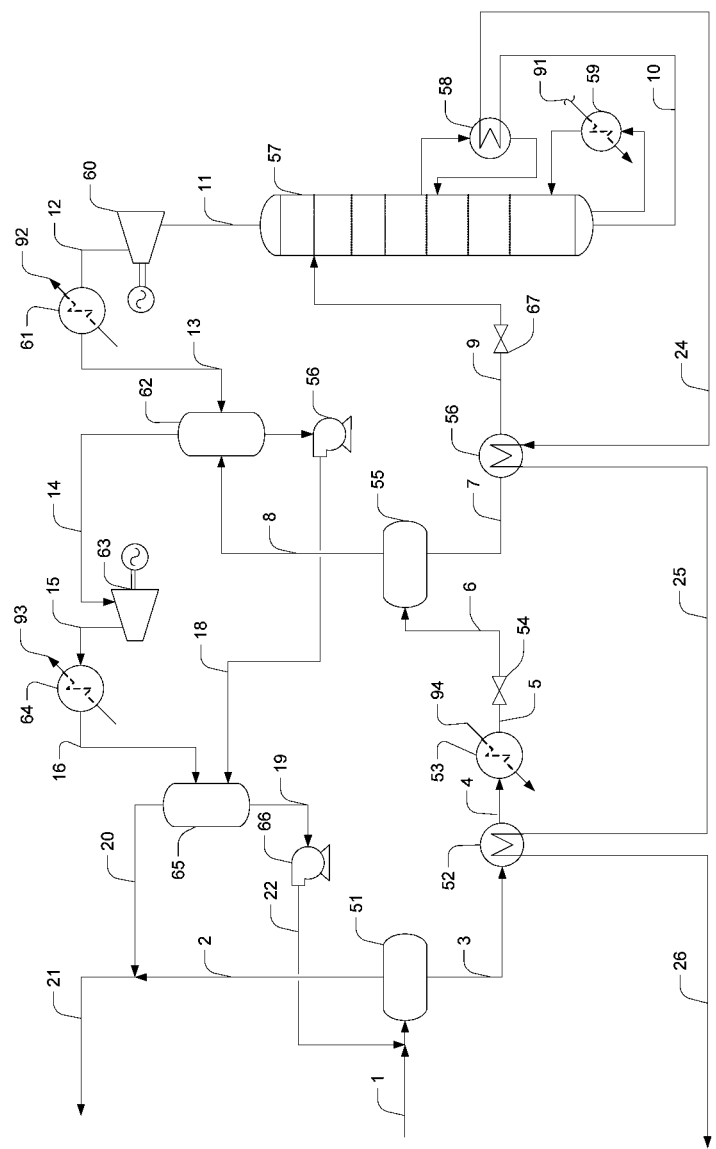
FIG. 1 is a schematic illustration of an exemplary known configuration for gas condensate recovery.

The inventors have unexpectedly discovered that gas condensate can be separated from various hydrocarbon feeds, and especially high-pressure hydrocarbon feeds in a configuration that exploits energy contained in the pressure for cooling and heat contained in hot compressor discharges (predominantly comprising $C_2$ and/or $C_3$ and lighter components) for stripping the lighter components from gas condensate. Such integration advantageously eliminates the requirement for an air cooler on the compressor discharge side as well as a steam heater that is otherwise required in currently known configurations. Moreover, particularly contemplated configurations may also include dual fractionation columns for further improving gas condensate recovery.

Preferably, gas condensate is recovered from a high-pressure (at least 500 psig, more preferably at least 700 psig, most preferably at least 1000 psig) hydrocarbon mixture in a manner in which gaseous and liquid hydrocarbons are separated from the mixture in three separation stages, and in which hot vapor discharge from compressors is used as a stripping medium. Typically, contemplated configurations will include a high-pressure separator as a first stage, and two fractionators as second and third stages that use hot vapor discharge from compressors as the stripping media. In such configurations, it is generally preferred that the hot vapor from the second stage compressor discharge is first mixed with the feed gas in the high pressure separator (where the lighter components [$C_2$, $C_3$, and lighter] are removed), to thereby produce a liquid rich in $C_4$+components. That liquid is further letdown in pressure and fed to the first fractionator where the hot vapor from the first stage compressor discharge strips the lighter components ($C_2$ and lighter) to thereby produce a bottom liquid rich in $C_4$+components. The so produced bottom liquid is further letdown in pressure and fed to a second fractionator where one or more reboilers are used to remove the residual $C_2$, $C_3$, and lighter components to thereby produce a bottom product that is depleted of undesirable lighter components.

It should be especially appreciated that contemplated configurations, when compared to heretofore known configurations and processes, provide significant reduction in heating and cooling duties by utilizing the waste heat from compressor discharge that is normally rejected using external cooling. Thus, by using waste energy for feed liquid heating, an external heat source can be eliminated. Moreover, as the compressor discharge needs no further cooling, the need for air coolers for the compressor discharge is also eliminated. Still further, the two-stage fractionation system produces surprising results as it significantly improves the overall gas condensate recoveries with less equipment and without use of external refrigeration. It should also be recognized that contemplated configurations and processes may be employed for both normally liquid and normally gaseous hydrocarbons, and are particularly well suited for production of $C_3$-$C_4$+liquefied petroleum gas in refinery gas separation or natural gas liquids separation. Still further, it is pointed out that in separation of normally gaseous hydrocarbons, the feed gas stream may contain substantial amounts of $H_2S$, carbon dioxide or nitrogen resulting from well injection of these gases (e.g., for enhanced oil recovery operations), which can also be advantageously processed without negatively affecting operation of contemplated configurations. In a typical operation, the hydrocarbon feed will be at a pressure of about 1100 psig to 1400 psig and a temperature of about 80° F. to 100° F. with the following composition:

| COMPONENT | MOL % |
| --- | --- |
| $H_2S$ | 6 |
| $CO_2$ | 5 |
| $C_1$ | 34 |
| $C_2$ | 16 |
| $C_3$ | 19 |
| $C_4$ | 13 |
| $C_5$+ | 7 |

A typical known configuration for separating such hydrocarbon feed is exemplified in Prior Art FIG. 1. Here, feed stream 1 is mixed with compressor discharge condensate stream 22 and separated in separator 51. The separator liquid 3 is heat exchanged in exchanger 52 and steam heater 53 to about 140° F. to 160° F., and is letdown in pressure to about 350 psig to 450 psig in separator 55 forming vapor stream 8 and flashed liquid stream 7. Vapor stream 8 is routed to separator 62 where it is mixed with cooled compressor discharge vapor 13 at about 100° F., and the mixture is further compressed in compressor 63. The liquid stream 7 from separator 55 is heated in exchanger 56 to about 130° F. to 180° F. and fed to a fractionator 57 operating at about 250 psig to 400 psig. The $C_2$, $C_3$, and lighter components are stripped with side reboiler 58 and bottom reboiler 59. The fractionator produces a lean gas 11 and a bottom stream 10 which is further heat exchanged with incoming feed in exchanger 56 and 52, forming the gas condensate product stream 26. The overhead vapor stream 11 is compressed by compressor 60, cooled in cooler 61, mixed with flashed vapor stream 8 and separated in separator 62. The separator vapor 14 is further compressed in compressor 63, cooled and separated in separator 65. The separator liquid stream 19 is pumped with pump 66 forming stream 22 at about 1100 psig to 1400 psig that is further mixed with stream 1 in separator 51. The separator vapor stream 20 is mixed with flashed vapor stream 2 from separator 51 forming the lean gas stream 21 that is further processed in a downstream unit.

Figure 2:
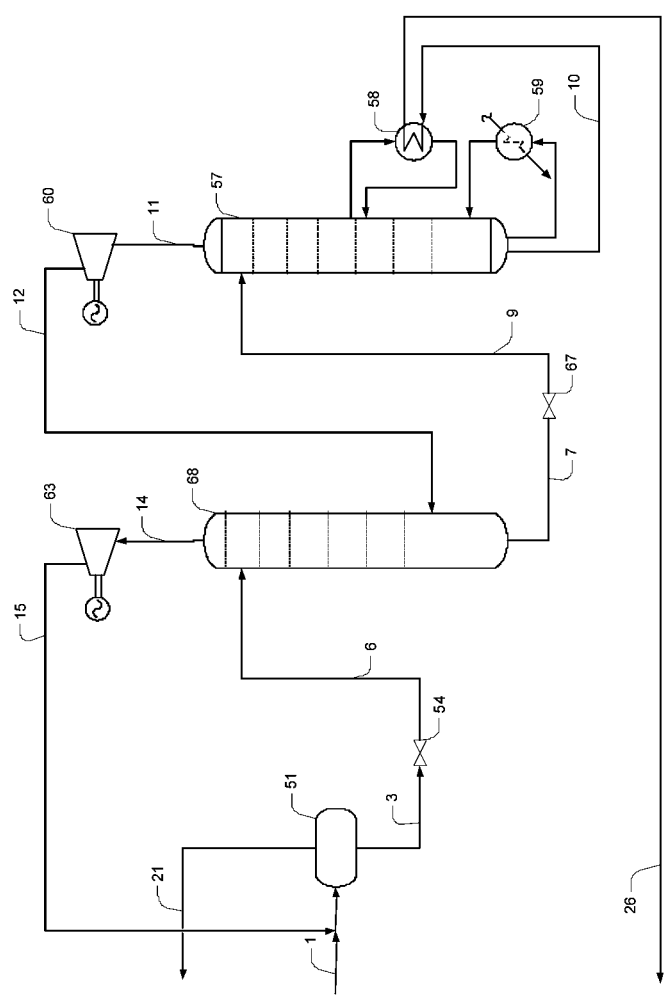
FIG. 2 is a schematic illustration of one exemplary configuration for gas condensate recovery according to the inventive subject matter.

In contrast, an exemplary configuration according to the inventive subject matter is depicted in FIG. 2. Here, feed stream 1 at about 1100 psig to 1400 psig and 80° F. to 100° F. is mixed with stream 15 from the discharge of compressor 63. The mixture is separated in separator 51 operating at a pressure of about 1100 psig and a temperature of about 80° F. to 130° F. It should be recognized that the heat content of the compressor discharge raises the mixture temperature to a temperature that allows stripping of at least 50%, more typically of at least 80%, and most typically of at least 90% of the light components ($C_2$, $C_3$, and lighter) from the feed liquid stream 1. This mixing and stripping stage has eliminated the cooler, separator and pumping on the compressor discharge (separator 65, pump 66 and exchanger 64 of Prior Art FIG. 1) and the heat exchangers for the separator liquid (exchanger 52 and exchanger 53 of Prior Art FIG. 1). Furthermore, it should be noted that no external heating (stream 94 in exchanger 53 of Prior Art FIG. 1) or cooling (stream 93 in exchanger 64 of Prior Art FIG. 1) is required in this step. The separator liquid 3 is letdown in pressure in valve 54 to about 450 psig to 600 psig, cooled by the JT effect to about 70° F. to 90° F. and fed to the top of the fractionator 68 as a cold reflux stream 6. Fractionator 68 preferably includes trays or packing for contacting devices (typically 12 to 15 contact stages or more are required). Hot vapor stream 12 from discharge of compressor 60 at about 150° F. to 200° F. is fed to the bottom of fractionator 68 and assists in stripping the lighter components ($C_2$, $C_3$, and lighter) to thereby produce a bottom liquid 7 (rich in $C_4$ and heavier components) of fractionator 68. The overhead vapor stream 14 of fractionator 68 at a temperature of about 80° to 100° F. is then compressed by compressor 63 to about 1100 psig to 1400 psig and about 200° F. to 250° F. and is mixed with the feed stream 1 for stripping. The fractionator 68 bottom liquid stream 7 at a temperature about 140° F. to 160° F. is letdown in pressure in valve 67 forming stream 9 at a pressure of about 250 psig to 450 psig and fed to the top of fractionator 57. Fractionator 57 preferably comprises trays or packing for contacting devices (typically 15 to 19 or more contacting stages are required). The $C_2$, $C_3$, and lighter components are stripped with heat supplied from side reboiler 58 and bottom reboiler 59. The fractionator 57 produces a lean gas 11 that is further compressed to about 450 psig to 600 psig, and a bottom stream 10, which is heat exchanged in the side reboiler forming the gas condensate product stream 26 that is depleted in the undesirable lighter $C_2$ or $C_3$ components.

Figure 3:
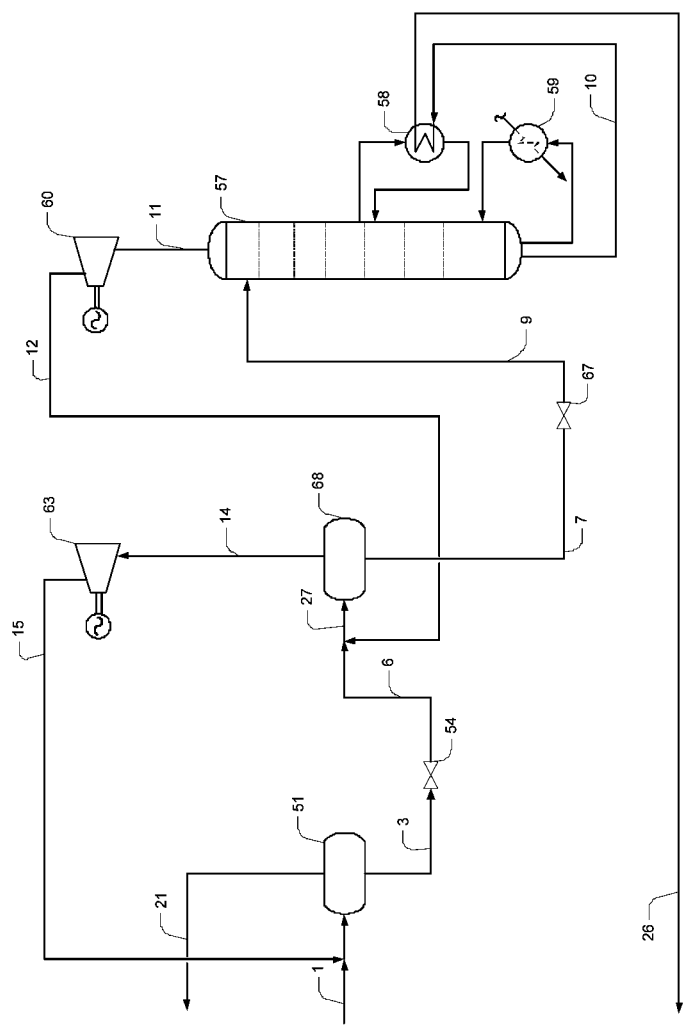
FIG. 3 is a schematic illustration of another exemplary configuration for gas condensate recovery according to the inventive subject matter.

Alternatively, fractionator 68 can be replaced by flash vessel 68 as shown in FIG. 3. In this case, the hot vapor stream 12 from compressor 60 is mixed with the flashed liquid stream 6 downstream of JT valve 54 from separator 51. The mixture stream 27 is flashed to 450 to 650 psig in separator 68 producing a lean vapor stream 14 and a $C_4$ rich liquid stream 7. The flashed vapor stream 14 is further compressed by compressor 63 and the flashed liquid stream 7 is letdown in pressure in JT valve 67 to form stream 9 feeding fractionator 57, as described in previous configuration. With respect to the remaining components and numerals therefore, the same considerations and numerals as described in FIG. 2 above apply.

Thus, it should be appreciated that a gas condensate production plant may include a separation unit configured to receive a processed or crude feed that includes $C_2$ and lighter components and $C_3$ and heavier components, wherein the separation unit is configured to operate under conditions that allow stripping of the $C_2$, $C_3$; and lighter components from the feed using a hot and compressed recycle stream (typically comprising $C_2$, $C_3$, and lighter components). The term "hot and compressed recycle stream" as used herein refers to a stream having a temperature and pressure that is higher that the temperature and pressure of the stream where that stream originates. Thus, most typically the recycle stream will be a stream that is generated within the gas condensate separation plant, wherein that stream is compressed in a compressor (and with that heated), or wherein a stream is withdrawn or generated within the plant and heated and/or compressed in a heat exchanger, heater, compressor, etc. Furthermore, the term "about" as used herein and where used in conjunction with a numeral refers to that numeral and an absolute deviation of that numeral of +/−20%, inclusive.

Most preferably, the recycle stream is generated in another separation unit that is coupled to and downstream of the first separation unit. While not limiting to the inventive subject matter, the separation units are preferably a vapor-liquid separator that operates at a pressure between about 300 psig and 1500 psig, and even more typically between about 500 psig and 1200 psig, or at least one of the separation units is a fractionator that operates at the same or similar pressure as the vapor-liquid separator. Thus, the recycle stream will include in most cases predominantly (at least 51%, more typically at least 65%, even more typically at least 80%, and most typically at least 90%) the C2 and lighter components, is in vapor form, and will be compressed to a pressure at which the separation unit operates and in which the recycle stream will act as a stripping vapor.

Depending on the particular configuration of the separation unit (e.g., vapor-liquid separator or fractionator), it should be recognized that the separation unit will be configured to receive the recycle stream comprising the $C_2$, $C_3$, and lighter components as a stream separate from the feed (e.g., as a striping vapor feed to the fractionator), or that the separation unit will be configured to receive a mixture of a hydrocarbon feed with the recycle stream (e.g., where the separation unit is a vapor-liquid separator). In most preferred aspects of contemplated gas condensate production plants, a second separation unit is fluidly coupled to the separation unit such that the second separation unit receives a liquid product from the separation unit, and wherein the second separation unit is further configured to produce the recycle stream (typically by stripping the liquid product with a compressed vapor enriched in C2 and lighter components).

Therefore, and viewed from another perspective, a gas condensate production plant will include a plurality of separation units coupled to each other such that a compressed vapor product of a downstream separation unit strips $C_2$, $C_3$, and lighter components from a feed in an upstream separation unit to thereby form a liquid product predominantly comprising $C_4$ and heavier components. Most typically, the liquid product formed in the upstream separation unit is fed to the downstream separation unit as a feed. As discussed above, it is contemplated that the upstream separation unit comprises a high-pressure vapor-liquid separator to which is coupled a mixing unit that is configured to allow mixing of the compressed vapor product and the feed prior to entry into the upstream separation unit. The downstream separation unit typically comprises a vapor-liquid separator or a fractionator, which may be configured to receive a mixture of the liquid product and a compressed vapor enriched in $C_2$, $C_3$, and lighter components, or which may be configured to receive the liquid product as a feed and, separately from the feed, a compressed vapor enriched in $C_2$, $C_3$, and lighter components lighter components as a stripping vapor.

Consequently, the inventor also contemplates methods of producing gas condensate that include a step in which $C_2$, $C_3$, and lighter components are separated from a second feed in a downstream separation unit to thereby form a liquid product comprising $C_4$ and heavier components. In another step, the separated $C_2$, $C_3$, and lighter components are compressed (and thereby heated to a temperature suitable to strip $C_2$, $C_3$, and lighter components from a hydrocarbon feed), and in still another step, the compressed and heated separated $C_2$, $C_3$, and lighter components are used to strip $C_2$, $C_3$, and lighter components from a first feed in an upstream separation unit to thereby form the second feed. In especially preferred aspects, the step of separating the $C_2$, $C_3$, and lighter components from the second feed comprises use of a compressed vapor enriched in $C_2$, $C_3$, and lighter components as a stripping vapor in the downstream separation unit. Typically, the upstream separation unit comprises a high-pressure vapor liquid separator, wherein the compressed separated $C_2$, $C_3$, and lighter components and the first feed are combined before entering the upstream separation unit. The downstream separation unit typically comprises a vapor-liquid separator or a fractionator. Furthermore, in most gas condensate production plants, a third separation unit is included that provides a compressed vapor enriched in $C_2$, $C_3$, and lighter components as a stripping vapor to the downstream separation unit, wherein most preferably, the third separation unit produces a gas condensate sales product (typically as a bottom product of a fractionator).

Thus, specific embodiments and applications of configurations and methods for gas condensate separation from high-pressure hydrocarbon mixtures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A gas condensate production plant comprising:
a separation unit having a feed inlet that is configured to receive a two-phase mixture of (a) a hot and compressed recycle stream comprising $C_2$, $C_3$, and lighter components and (b) a hydrocarbon feed comprising $C_2$, $C_3$, and lighter components and $C_4$ and heavier components,
wherein the hot and compressed recycle stream comprising $C_2$, $C_3$, and lighter components is present in the two-phase mixture in an amount effective to increase a temperature of the hydrocarbon feed to allow the separation unit to operate under conditions that allow stripping of at least 50% of the $C_2$, $C_3$, and lighter components from the feed using the hot and compressed recycle stream to thereby form a separation unit vapor product comprising the at least 50% of the $C_2$, $C_3$, and lighter components, and
wherein the recycle stream has a temperature of between 200° F. to 250° F. and a pressure of between 1100 psig to 1400 psig, and wherein the recycle stream is generated in a second separation unit downstream of the separation unit, is in vapor form, and is compressed to a pressure at which the separation unit operates.

2. The plant of claim 1 wherein at least one of the separation unit and the second separation unit is a vapor-liquid separator.

3. The plant of claim 1 wherein the second separation unit is fluidly coupled to the separation unit such that the second separation unit receives a liquid product from the separation unit and wherein the second separation unit is further configured to produce the recycle stream.

4. The plant of claim 3 wherein the second separation unit is configured to form the recycle stream by stripping the liquid product with a compressed vapor enriched in C2 and lighter components.

5. A gas condensate production plant comprising a plurality of separation units coupled to each other such that a hot and compressed recycle stream produced from a downstream separation unit strips $C_2$, $C_3$, and lighter components from a hydrocarbon feed comprising $C_2$, $C_3$, and lighter components and $C_4$ and heavier components in an upstream separation unit to thereby form a liquid product comprising $C_3$, $C_4$, and heavier components, and wherein the upstream separation unit is configured to produce a vapor product comprising the $C_2$, $C_3$, and lighter components and to receive a two-phase mixture of (a) the hot and compressed recycle stream having a temperature of between 200° F. to 250° F. and comprising $C_2$, $C_3$, and lighter components and (b) the hydrocarbon feed wherein the hot and compressed recycle stream is present in the two-phase mixture in an amount effective to increase the temperature of the hydrocarbon feed within the two-phase mixture.

6. The plant of claim 5 wherein the liquid product formed in the upstream separation unit is fed to the downstream separation unit as a feed.

7. The plant of claim 5 wherein the upstream separation unit comprises a high-pressure vapor-liquid separator.

8. The plant of claim 5 further comprising a mixing unit configured to allow mixing of the hot and compressed recycle stream and the hydrocarbon feed prior to entry into the upstream separation unit.

9. The plant of claim 5 wherein the downstream separation unit comprises a vapor-liquid separator or a fractionator.

10. The plant of claim 5 wherein the downstream separation unit comprises a vapor-liquid separator and wherein the downstream separation unit is configured to receive a mixture of the liquid product and a compressed vapor enriched in $C_2$, $C_3$, and lighter components.

11. The plant of claim 5 wherein the downstream separation unit comprises a fractionator and wherein the downstream separation unit is configured to receive the liquid product as a feed.

12. A method of producing gas condensate comprising:
separating $C_2$, $C_3$, and lighter components from a second feed in a downstream separation unit to thereby form a liquid product comprising $C_4$ and heavier components;
compressing the separated $C_2$, $C_3$, and lighter components to thereby form a hot and compressed recycle stream having a temperature of between 200° F. to 250° F.; and
forming a two-phase mixture by combining the hot and compressed recycle stream with a first feed to strip $C_2$, $C_3$, and lighter components from the first feed in an upstream separation unit to thereby form the second feed wherein the hot and compressed recycle stream is present in the two-phase mixture in an amount effective to increase the temperature of the first feed to allow stripping of at least 50% of the $C_2$, $C_3$, and lighter components from the first feed using the hot and compressed recycle stream, and wherein the upstream separation unit produces a vapor product comprising the at least 50% of the $C_2$, $C_3$, and lighter components from the first feed.

13. The method of claim 12 wherein the step of separating the $C_2$, $C_3$, and lighter components from the second feed comprises use of a compressed vapor enriched in $C_2$, $C_3$, and lighter components as a stripping vapor in the downstream separation unit.

14. The method of claim 12 wherein the downstream separation unit comprises a vapor-liquid separator or a fractionator.

15. The method of claim 12 wherein a third separation unit provides a compressed vapor enriched in $C_2$, $C_3$, and lighter components as a stripping vapor to the downstream separation unit.

16. The method of claim 15 wherein the third separation unit produces a gas condensate sales product.

* * * * *